Figure 1:
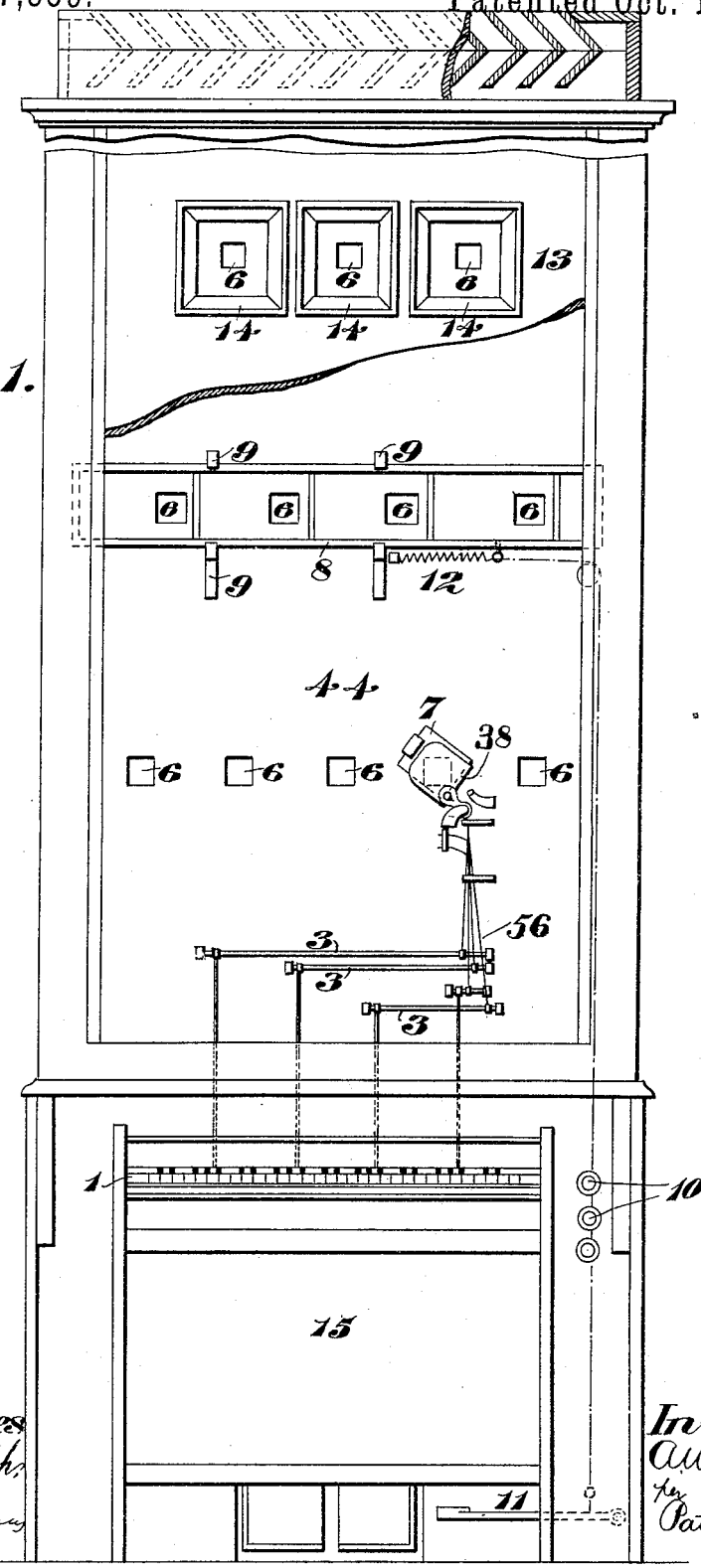

(No Model.) 5 Sheets—Sheet 1.

A. W. RIMINGTON.
METHOD OF AND APPARATUS FOR PRODUCING COLOR EFFECTS.

No. 547,359. Patented Oct. 1, 1895.

Witnesses
Geo. E. Frech
Jas. V. Beray

Inventor
A. W. Rimington
per Pattison & Nesbit
Att'y

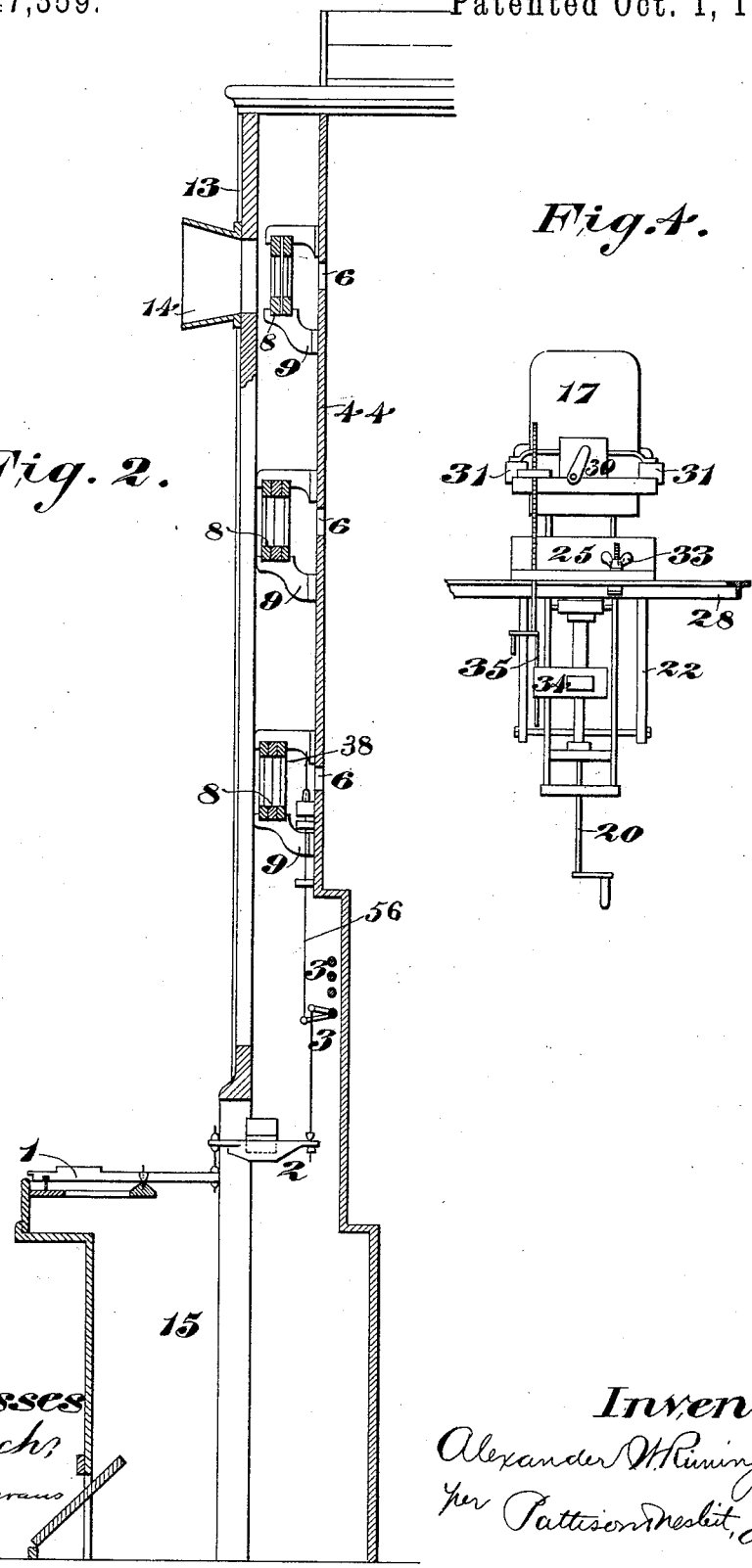

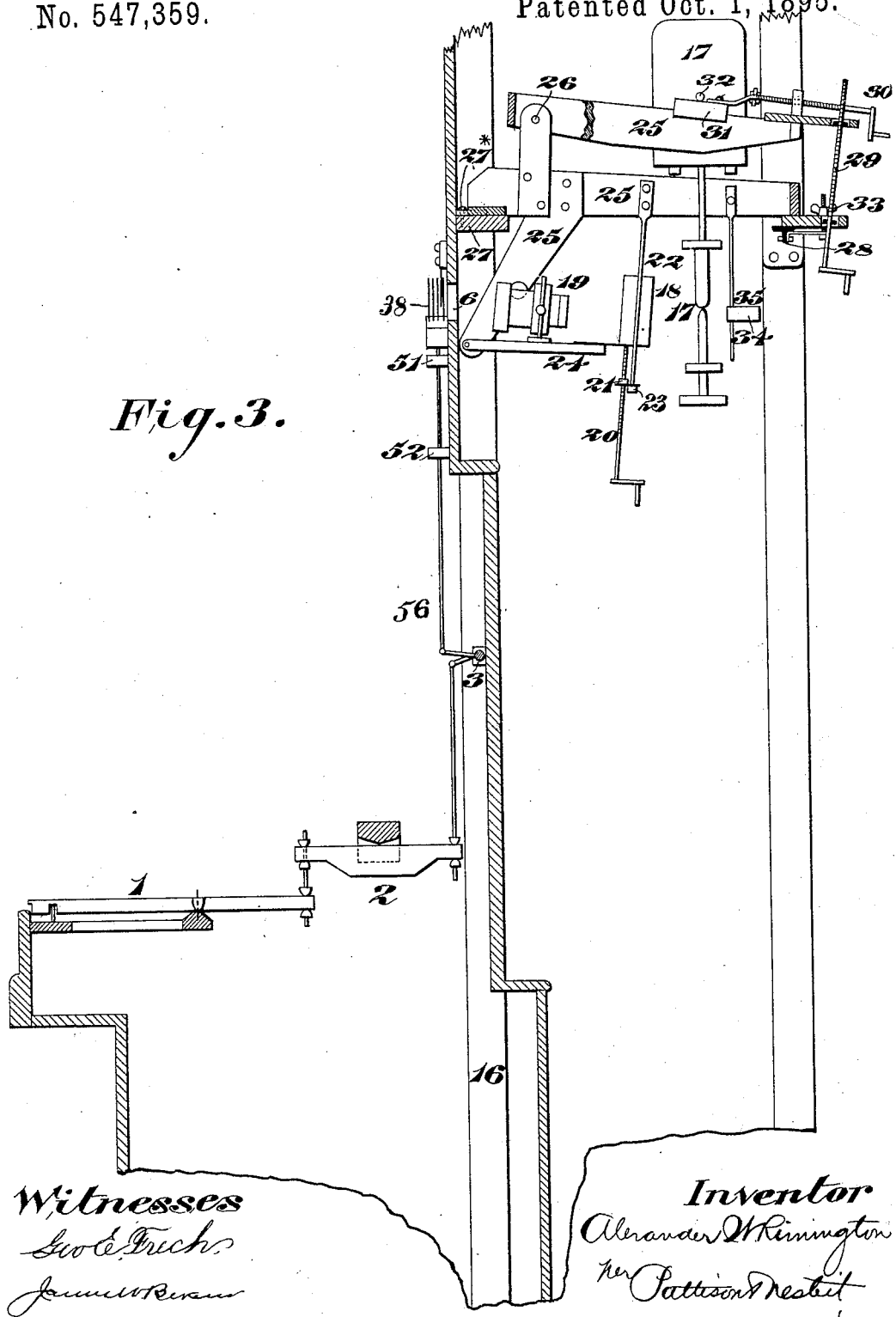

(No Model.) 5 Sheets—Sheet 4.
A. W. RIMINGTON.
METHOD OF AND APPARATUS FOR PRODUCING COLOR EFFECTS.
No. 547,359. Patented Oct. 1, 1895.
*Fig. 5.* *Fig. 6.*
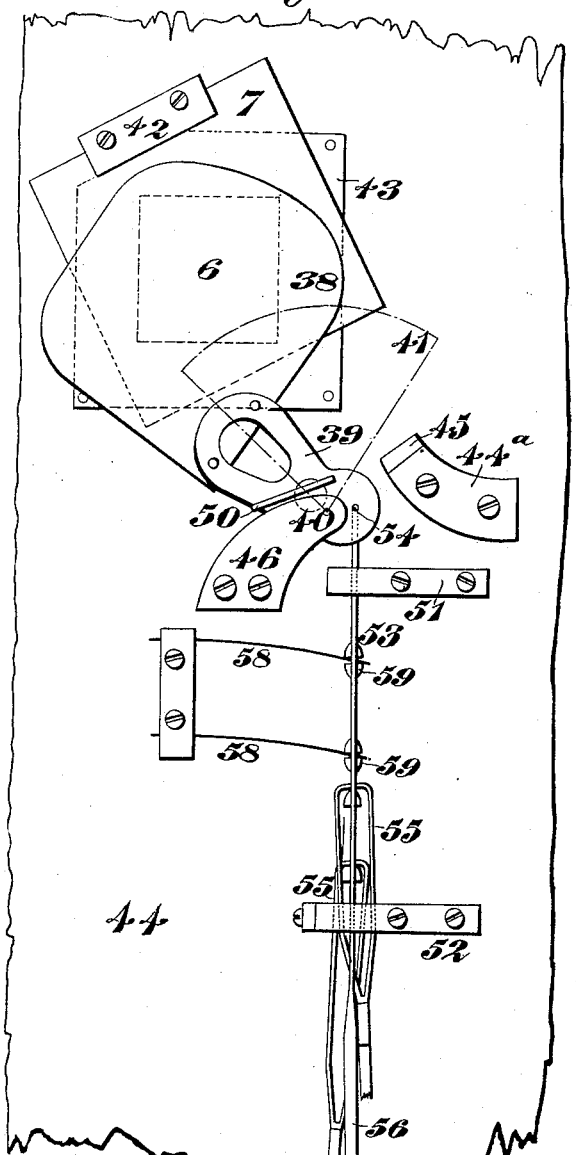
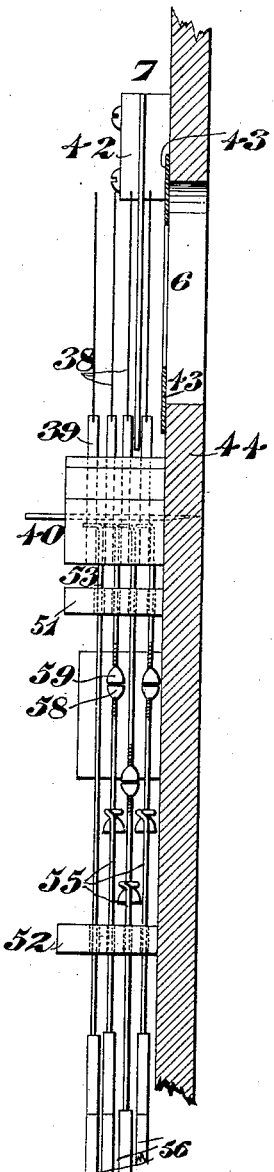
*Fig. 14.* *Fig. 15.*
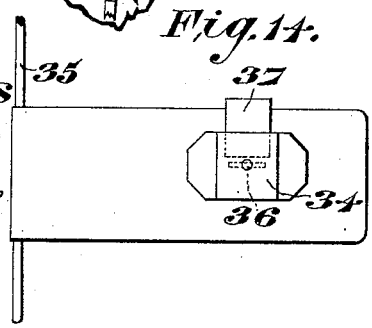
Witnesses Inventor:

(No Model.) 5 Sheets—Sheet 5.
A. W. RIMINGTON.
METHOD OF AND APPARATUS FOR PRODUCING COLOR EFFECTS.
No. 547,359. Patented Oct. 1, 1895.
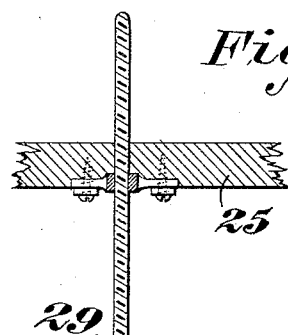
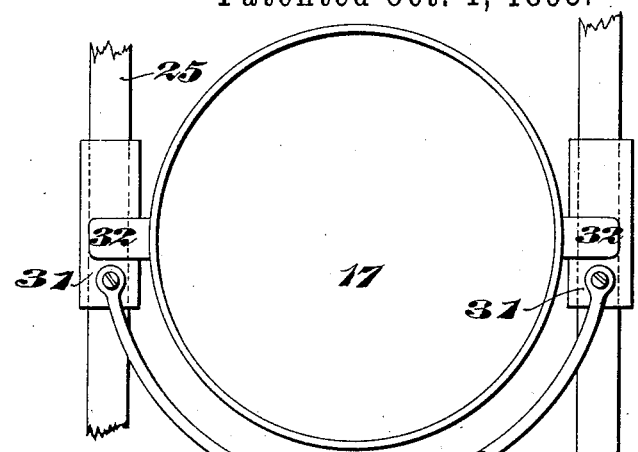
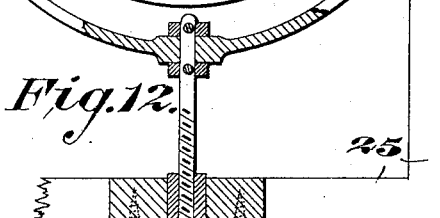
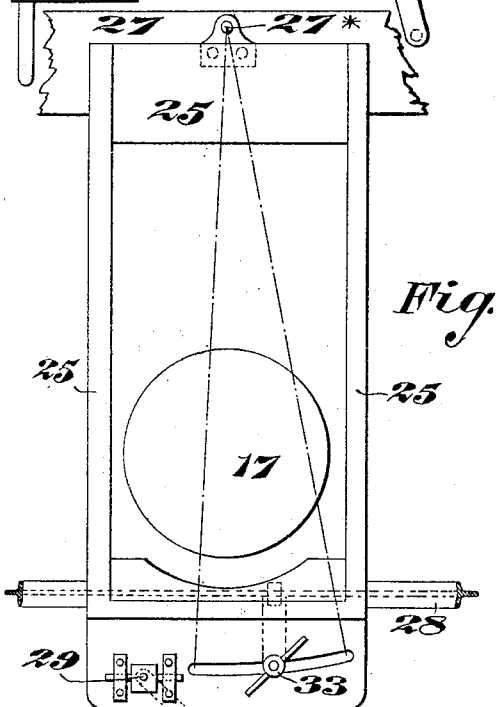
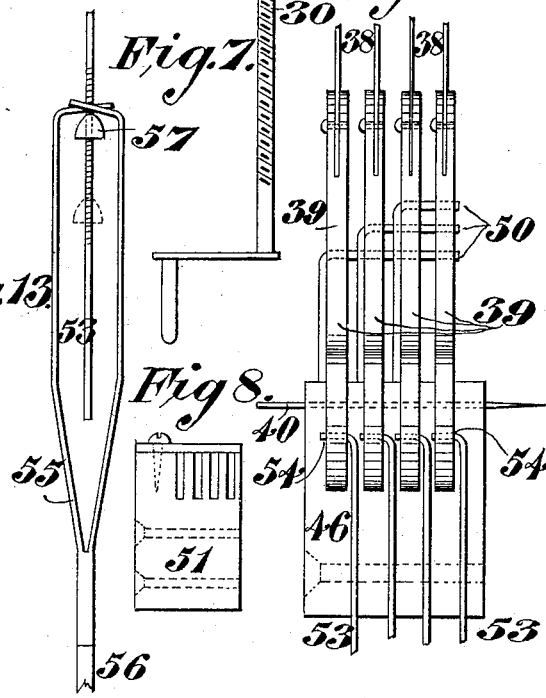
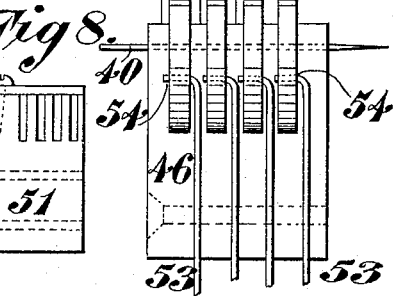
Witnesses.
Geo. E. Frech.
James W. Evans.
Inventor.
Alexander W. Rimington
per Pattison & Nesbit, Atty's

UNITED STATES PATENT OFFICE.

ALEXANDER WALLACE RIMINGTON, OF LONDON, ENGLAND.

METHOD OF AND APPARATUS FOR PRODUCING COLOR EFFECTS.

SPECIFICATION forming part of Letters Patent No. 547,359, dated October 1, 1895.

Application filed July 16, 1894. Serial No. 517,745. (No model.)

*To all whom it may concern:*

Be it known that I, ALEXANDER WALLACE RIMINGTON, a subject of the Queen of Great Britain and Ireland, residing at 26 Kensington Park Gardens, Bayswater, in the county of London, England, have invented a Method of and Apparatus for Producing Color Effects, of which the following is a specification.

According to this invention colored light is projected onto a screen or other suitable body or surface in such a manner as to give effects in color, bearing a more or less definite relationship to certain sound-vibrations. This may be effected in a variety of ways, such as by employing a keyboard with appropriate mechanism to control devices, such as diaphragms, adapted to arrest or permit rays of light to pass from any suitable source onto the screen or other object on which the color effects are to be produced, such rays of light being projected through suitable colored media onto the said screen or other object. Thus it will be understood that by this invention, *inter alia*, sound-music may, figuratively speaking, be translated into color-music. In order to throw colored light upon a screen or other suitable object according to the novel method set forth, apparatus variously constructed and arranged can, as already indicated, be employed. An arrangement for the purpose may comprise, for example, a keyboard arranged in any convenient manner—as, for instance, it may be similar to that of a pianoforte or organ, this keyboard being connected by a series of trackers or wires with a corresponding set of diaphragms, adjusted and balanced by weights or otherwise, arranged in front of a number of reflectors and lenses, and a set of colored glasses, films, or spectroscopic prisms, arranged in such a manner as to color the light reflected from the mirrors on passing through the lenses, there being in connection therewith special fittings with suitable sources of light, such as arc electric lamps or oxyhydrogen lamps. As an additional feature I in some cases also make provision for the introduction of the element of variable form and intensity into the rays of light passing through the corresponding color medium and the color space or image thus produced upon the screen.

Apparatus constructed and arranged in any convenient form to operate on the principle of this invention can be used, figuratively speaking, to translate sound-music into color-music by such adjustment of individual colors of the spectrum upon the said glass or other diaphragms in regard to the sound-vibrations to which they correspond as approximately to correspond also with the relative air-vibrations of the chromatic scale as such is understood in music. In other words, according to the just-indicated application of this invention, each note of the keyboard will be connected with a color whose place in the spectrum will correspond in a certain mathematical sense with the place occupied by a note upon the chromatic sound-scale of the musical instrument.

The invention is also applicable, by arranging the said colors and notes or keys of the keyboard to correspond with any other arbitrary scale which may be desired, for the purpose of producing other forms of color-music or carrying out color experiments.

By suitable modifications of certain features in carrying out the invention it can be adapted to meet the requirements of color measurement and notation for artistic and art industrial purposes. The mode of effecting this will be readily understood when it is remembered that the process admits of notation exactly as in the case of music.

In order to facilitate the use of the apparatus, the keys of the keyboard may be also colored to correspond with the respective colors projected upon the screen by lenses or reflectors.

The accompanying drawings illustrate, by way of example, a construction of apparatus for carrying my invention into effect.

In the drawings, Figure 1 shows a front elevation of the apparatus, partly in section. Fig. 2 shows parts of the apparatus in vertical section in a plane at right angles to Fig. 1. Fig. 3 is also a vertical section in a plane at right angles to Fig. 1, but is, like other views hereinafter referred to, drawn to a larger scale. This view shows one of the front apertures 6 and the arrangement with respect to it of the corresponding lamp 17, condenser 18, lens 19, and set of diaphragms 5, connected to the keyboard, as also the arrangements for supporting and adjusting the lamp, condenser, and lens. Fig. 4 is a detached view at right angles to Fig. 3, showing the means illustrated in that figure for supporting and adjusting the lamp and other parts. Fig. 5 shows, in front elevation, a set of diaphragms with their holders, actuating-wires, springs, buffer-stop, and other parts hereinafter described. Fig. 6 is a view, partly in section, at right angles to Fig. 5. Fig. 7 shows, to a larger scale, a wire loop 55 and a wire 53, which is connected, as hereinafter described, to a diaphragm-holder, and is furnished with an adjustable nut or button 57, so that downward movement of the loop 55 will, through the button 57 and wire 53, actuate the corresponding diaphragm-holder, and that the wire 53 can move downward without actuating the loop 55. Fig. 8 shows in plan the construction of the registers through which the wires 53 and loops 55, respectively, work. Fig. 9 shows, to a larger scale than Fig. 6, a series of diaphragm-holders, together with attached, connected, and adjacent parts hereinafter more particularly referred to. Figs. 10 and 11 are detail views of the adjusting-screw arrangement shown to a smaller scale at 29 in Fig. 3. Fig. 12 is a detail view of the arrangement, shown to a smaller scale in Fig. 3, for adjusting the distance of the lamp from the front of the apparatus along the upper part of frame 25. Fig. 13 is a detail view of the arrangement, shown to a smaller scale in Fig. 3, for enabling the position of the lamp to be adjusted in a lateral sense. Figs. 14 and 15 are views, at right angles to one another, of the adjustable eyepiece employed to facilitate accurate adjustment of the lamp-arc, notwithstanding irregularities in the combustion of the carbons.

1 is a keyboard, similar to that of an ordinary organ, from which the movement of the keys is conveyed, by means of stickers and trackers and the back fall 2, to the rollers 3, which rollers transfer the movement, in the manner usual in an organ, to the trackers 56. These trackers actuate the diaphragms 38, of which there is a series opposite each front aperture 6, (see Figs. 1, 2, 3, 5, 6, and 9,) in such manner as to cause the said diaphragms to rise and fall or oscillate in front of the apertures 6, so that the respective diaphragms will be opposite to the corresponding apertures or not, according as the corresponding keys of the keyboard are for the time being elevated or depressed.

It is advisable to make the diaphragms 5 of some material that is strong, light, and capable of enduring high temperatures. I have obtained satisfactory results by using thin pieces of mica, and in order to obviate noise, which I found liable to occur when employing a single thickness, I construct each diaphragm of two layers or films secured in one and the same diaphragm-holder, so as to be held in contact with one another. The said diaphragms are colored with the respective colors referred to above, or tinted gray, or otherwise adapted to absorb a portion of the light sent through them, as hereinafter described, the object being to enable any given note or key to allow the given strength of a certain color to pass the corresponding aperture 6 and appear upon a screen or other suitable object placed in front of the instrument. That diaphragm of each series which is nearest to the corresponding aperture 6 is rendered non-transparent by being smoked and varnished, or may be made of a thin plate of metal or other suitable material. An arrangement is provided, as hereinafter explained, by which, on the depression of any given note of the octave, this non-transparent diaphragm is removed simultaneously with any other diaphragm or diaphragms of the series belonging to the same aperture 6, the object being that on the depression of any given key this non-transparent diaphragm shall invariably be moved from the front of its aperture 6, so as to allow the cone of light-rays from the corresponding lamp to pass through such aperture.

In addition to the movable diaphragms 5 there is a stationary diaphragm fixed immediately in front of the non-transparent diaphragm, and, whether the other movable diaphragm be colored or be tinted gray or otherwise rendered absorbent of light, this fixed diaphragm is invariably colored of the tint which corresponds to the given note upon the keyboard.

For the transparent colored diaphragms it is important to use transparent colors and varnishes capable of withstanding the high temperature and powerful light. As the result of numerous experiments, I have found it advantageous to use what is known as "Soehné's No. 3 varnish" and various colors of aniline origin, such as aurine, mixing the color and varnish in proportions depending upon the depth of color required, applying the varnish so colored to the mica or glass diaphragm in the same way that a photographer covers a photographic plate with collodion, and drying afterward by artificial heat. When I have failed to obtain the particular color desired, I have used, in lieu of juxtaposed colored films of mica, a piece of colored glass having, as nearly as possible, the color desired, and I have corrected the color by the use of a superimposed tint of colored varnish such as already described. In these cases the mica diaphragms, tinted gray or otherwise rendered partially non-transparent to light, have merely served to partially resist the passage of the light or to allow more or less of it to pass, for which reason such diaphragms may conveniently be called, for distinction, "absorption" diaphragms, the color being given by the one fixed plate of glass.

39 39 are the diaphragm-holders. They are made as light as possible. They may be of any suitable material. I have used mahogany with satisfactory results.

Referring to Figs. 5 to 9, the holders constituting a series are pivoted upon a rod or center 40, so as to be capable of oscillation in the direction indicated by the dotted lines 41.

7 is the fixed diaphragm. It is carried by the nipping-block 42.

43 is a perforated metal plate attached to the face of the diaphragm-board 44 and determining the effective area of the aperture 6, which may be of any desired shape.

44$^a$ is a buffer-block, to which is attached a piece of thick felt 45, which receives the impact of any diaphragm-holder 39 when thrown back by the depression of a note of the keyboard.

46 is a block or bracket accurately grooved to take the diaphragm-holders 39, which are mounted upon the steel center-pin 40, upon which they oscillate.

50 50 are arms formed of wire, (it may be brass wire,) each securely attached to a diaphragm-holder 39 and bent horizontally so as to extend across the back of the diaphragm or diaphragms at the inner side of that to which it is secured, the arrangement being such that upon the outermost diaphragm being moved it will carry the remaining three with it. Upon the second diaphragm being moved it will carry the two at its inner side, and so on.

51 and 52 are registers or guides constructed as shown in Fig. 8. Both these registers or guides are "clothed" to prevent noise and friction.

53 53 are wires each bent to a right angle at its upper part, so as to engage in a hole at 54 in the corresponding diaphragm-holder. Each of these wires is actuated by a wire loop 55 attached to a tracker 56. Upon each wire 53 there is a nut or button 57, so that when the tracker is actuated so as to pull down a wire loop 55 the corresponding wire 53 will be pulled down; but that upon any given diaphragm being moved the remaining wires, which are depressed by others of the diaphragm-holders simultaneously moved, may pass freely through their respective holes at the tops of the loops 55. The diaphragm-holders 39 and the wires 53 are held in position by springs 58, which are regulated by the nuts or buttons 59.

In order to overcome the slight disadvantage resulting from having to move a number of diaphragms and springs by the depression of one note in the upper octaves, and in order also to be able to increase the size of the diaphragms, if desired, without throwing undue stress on the notes of the keyboard, I may in some cases attach to the trackers a pneumatic arrangement such as is sometimes employed in organs. Behind the aperture 6 are placed the lamps or other suitable sources of light and the lenses whereby to project cones of light-rays through the apertures.

In the arrangement illustrated (see Fig. 3) 17 is a self-focusing electric-arc lamp, but there may be substituted an oxycalcium burner or other suitable source of illumination. 18 is a condenser and 19 a lens through which the light is carried to the aperture 6. 20 is a screw engaging in a nut 21, which is carried by the rods 22 and plate 23. The screw 20 is for the purpose of raising or lowering the table 24, which carries the condenser and lens. This table and the arc-lamp 17 are carried by the frame 25, which rests upon the wooden support 27 and is also supported by the T-shaped bar 28, forming part of the general framing of the instrument. The upper portion of the frame 25 is pivoted at 26 and can be raised or lowered by the screw 29, Figs. 10 and 11. This is to provide for the accurate adjustment of the carbon-points of the arc-lamp 17 opposite the condenser 18. Adjustment of the lamp in a direction from front to back of the apparatus is provided for by the screw 30, (see Fig. 12,) which is attached to the blocks 31, adapted to slide on the top of the frame and carry the lamp-pivots 32. Lateral adjustment is provided for by providing the frame 25, which is pivoted at 27*, with a slot and pinching-screw 33. (See Fig. 13.) The pivoted frame 25 slides upon the bar 28. In order to facilitate this lateral adjustment, to enable the carbon-arc to be accurately adjusted and kept in proper position, notwithstanding any irregularities in the combustion of the carbon-points, there is provided an eyepiece 34, Figs. 14 and 15. It can be raised and lowered upon the rod 35, and the small slit 36 is capable of being rendered as narrow as may be desired by the small metal slide 37, which is made to fit tightly upon the front plate of the eyepiece or gage.

It is to be understood that the various adjusting devices hereinbefore mentioned are provided in order that the cones or beams of light passing through the various openings 6 may be projected wholly or partially onto one and the same portion of a screen or other body, in order that the resultant color effect produced on such screen or body shall be that due to the combination of all the beams or cones of light projected at any given time.

Where it is desired to enable (a) glasses upon which forms produced by sound-vibrations or by photography, drawing, or painting, or (b) glasses of varying transparency to be shifted across the paths of the cones of light-rays, so as to increase or diminish the quantity of colored light projected upon the screen or other suitable object, the following arrangement may be conveniently employed.

Referring to Figs. 1 and 2, immediately in front of the diaphragms, or it may be in front of the lenses behind the apertures 6, I arrange a series of frames 8, which are carried upon brackets 9, or upon other suitable supports, and are adapted to be shifted from side to side by means of the stops 10 or pedal 11, and to return to a fixed position, by springs 12 or equivalent means, on the stop or stops being replaced or on the pedal being released. These frames 8 are each fitted with panes of glass, the number of which corresponds to that of the apertures 6 opposite which the frame is placed, the portion of each pane that is normally opposite an aperture being plain, so as to have no effect on a beam of light passing through it, while the remaining portion is of the nature mentioned under a or b and is brought opposite the opening by moving the frame to the right. In front of the frame 8 is an outer casing 13, which carries a series of projecting funnels 14, corresponding in position with the apertures 6, these funnels having for object to prevent any escape of light sidewise from behind the diaphragms. The space 15 is or may be occupied by an American organ or harmonium actuated by the same keyboard that actuates the diaphragms 5. In this way both light and sound music may conveniently be played at the same time and the color-organ will be enabled the better to be accompanied by other sound instruments or an orchestra, &c.

With regard to the form to be introduced by means of the sliding frames above referred to, I may mention that I have employed the kind of forms produced by sound known as the "Watts-Hughes voice pictures," photographs of cloud-forms, and other objects.

My invention is susceptible of various applications. One of these is the direct production, by means of the keyboard, from music written for an instrument such as the organ or pianoforte, of what I call "color-music," by which expression I desire to have it understood that I mean color effects produced upon a screen or other suitable object, and which are variable in point of combination, intensity, tint, and rapidity of change in the same way that in sound-music given notes are variable in point of combination, intensity, tone, and rapidity of change, at the will of the executive musician. In this connection it will be evident that by my invention I am enabled to associate time and rhythm with color and an almost infinite number of varying combinations of color in the same way that the almost infinite number of sound combinations may be obtained by means of known sound-instruments, such as the organ or piano; or color-music may be produced as a separate composition and independently of sound-music, though accompanied by it in some cases on other instruments or an orchestra.

My apparatus can also be constructed in such a manner as to express or take advantage of the remarkable analogy which exists between the prismatic spectrum of white light and the musical scale.

In the case of the spectrum, the lowest visible color in the red portion of the spectrum-band approximately corresponds to a rate of four hundred and fifty-one millions of millions of vibrations per second, and the highest visible color in the violet portion to a rate of seven hundred and eighty-five millions of millions of vibrations per second or, roughly, double that of the red portion.

Taking any tonic note—say, C—on the sound or musical scale, the corresponding note at the top of the octave has double the number of air-vibrations per second, and if we suppose the said tonic note to correspond with the extreme red of the spectrum and the seventh musical note, or note immediately below the upper tonic, to correspond to the extreme violet of the spectrum, we have the closest possible analogy, in point of ratio of vibration, between the color-octave of the spectrum and the sound-octave of the musical scale.

In one form of my instrument the intervals between the colors, taking them in point of position along the spectrum-band and their ratio of vibration, have been arranged upon the same chromatic and diatonic system as that of the notes of the musical scale, the octave being completed by the recurrence of the red, toward which the blue end of the spectrum would seem to tend, by the gradual conversion of the blue into violet, this upper red note thus recurring as the tonic recurs in the final note of the musical octave, and the relative ratio of vibration of the other notes being in an identical relationship on both the color-scale of this "color-organ," as it may be called, and any properly-tuned sound-organ or pianoforte. With this object in view, the color of the diaphragms used in my "color-organ," as I call it, are obtained, when it is used for this musical purpose, by calculating the approximate ratio of vibration at proper intervals along the whole length of the spectrum, projected upon a white screen and matching the color at the required points, corresponding in respect of the ratio of vibration to the notes of the musical scale. This is done by cutting off by a suitable slit, as understood in connection with the spectroscope, a narrow band of color at these respective points or intervals, and experimentally varying the color of the diaphragm by the use of various coloring agents, such as hereinbefore referred to, or by means of superimposed tinted glasses, until on passing a beam of white light through it a similar color band or indication is obtained or projected upon the spectrum-screen, corresponding in tint to that of the above-mentioned narrow band of color.

Another application of my invention is for the production of color effects entirely independently of sound-musical relationship, for stage and other purposes. It may also be used for experimenting upon and notation of combinations of colors for artistic, scientific, or manufacturing purposes.

What I claim is—

1. A method of producing color effects such as hereinabove referred to as "color music" which consists in causing separate and differently colored beams of light to be projected in a more or less intermittent and variable manner upon a screen or other object so as to wholly or partly coincide thereon and produce color effects that are variable in point of combination, intensity, tint and rapidity of change.

2. A method of producing color effects such as hereinabove referred to as "color music," which consists in causing beams of light to pass through separate and differently colored media, varying the intensity of the colored beams of light thus obtained, and causing said colored beams of light to be projected in a more or less intermittent manner and in variable numbers at a time wholly or partly upon the same portion of a screen or other object so as to produce color effects thereon that are variable in point of combination, intensity, tint and rapidity of change, as set forth.

3. A method of producing color effects such as hereinabove referred to as "color music," consisting in causing one, two or more of a series of beams of light the colors of which correspond to numbers of light vibrations having approximately the same ratio to each other as that of the numbers of air vibrations corresponding to the notes upon the chromatic sound scale of a musical instrument, as herein set forth, to be projected in a more or less intermittent and variable manner upon a common portion of a screen or other object so as to thereby produce all the effects of rhythm or time as in sound music.

4. For producing color effects such as hereinabove referred to as "color music," apparatus comprising a source of light, appropriately colored media arranged in the paths of converging beams of light traveling from said source in a direction such that the several beams or portions of each will fall upon a portion of a screen or other object common to them, movable non-transparent diaphragms whereby the said beams of light or parts thereof can at will be arrested or allowed to travel from said source of light through said colored media in a regulated manner and be combined on said screen or other object and keys and connecting mechanism adapted to operate said non-transparent diaphragms, as set forth.

5. For producing color effects such as herein referred to as "color music," apparatus comprising means for converging beams of light or parts thereof onto a common portion of a screen or other object, appropriately colored media and absorption diaphragms arranged in the paths of said converging beams of light, opaque diaphragms whereby the said beams can be arrested or projected at will, and keys and connecting mechanism whereby said absorption and opaque diaphragms can be operated in any desired order substantially as herein described for the purposes specified.

6. For producing color effects such as hereinabove referred to as "color music," apparatus comprising a source of light, means for converging two or more beams of light or parts thereof from said source onto a common portion of a screen or other object, appropriately colored media arranged in the paths of said converging beams of light, opaque diaphragms whereby the said beams of light can at will be arrested, or projected in a regulated manner from said source of light through said colored media and wholly or in part combined on said screen or other object keys and connecting mechanism whereby said opaque diaphragms can be operated, variable effect diaphragms adapted to be interposed in the paths of said beams, and means for moving said variable effect diaphragms into and out of the paths of said beams, substantially as herein described for the purpose specified.

7. For producing color effects, apparatus comprising lamps, condensers and lenses whereby converging beams of light can be projected from said lamps onto a screen or other object so as to wholly or partially overlap each other thereon, colored and opaque diaphragms normally arranged in the paths of said beams, and keys and connecting mechanism whereby said opaque diaphragm can be operated in a systematic manner, substantially as herein described for the purpose specified.

8. For producing color effects, apparatus comprising lamps, condensers and lenses for projecting converging beams of light from said lamps onto a screen or other object so as wholly or partially to overlap one another thereon, colored and opaque diaphragms normally arranged in the paths of said beams, keys and connecting mechanism whereby said opaque diaphragms can be operated in a systematic manner, variable effect diaphragms adapted to be moved across the paths of said beams, and means for operating said variable effect diaphragms, substantially as herein described.

9. For producing color effects, apparatus comprising a casing formed with a number of apertures, lamps arranged behind said apertures, condensers and lenses arranged between said lamp and apertures, means for independently adjusting the position of each center of light and each combined condenser and lens, sets of diaphragms arranged opposite said apertures and each consisting of a fixed colored diaphragm, a set of movable absorption diaphragms, and a movable opaque diaphragm, a key board, and mechanism connecting each of the keys of said key-board with one of the movable absorption diaphragms, and the opaque diaphragm of the corresponding set of movable diaphragms subtantially as herein described for the purposes specified.

10. For producing color effects, apparatus comprising a casing formed with a number of apertures, lamps arranged behind said apertures, condensers and lenses arranged between said lamp and apertures, means for independently adjusting the position of each center of light and each combined condenser and lens, sets of diaphragms arranged opposite said apertures and each consisting of a fixed colored diaphragm, a set of movable absorption diaphragms, and a movable opaque diaphragm, a key board, mechanism connecting each of the keys of said key-board with one of the movable absorption diaphragms and the opaque diaphragm of the corresponding set of movable diaphragms sliding frames carrying variable effect diaphragms, and means for bringing the latter diaphragms opposite said apertures substantially as herein described for the purposes specified.

In testimony whereof I have signed my name to this specification in the presence of two subscribing witnesses.

ALEXANDER WALLACE RIMINGTON.

Witnesses:
W. B. WILBERFORCE,
H. HEATHER.